(12) United States Patent
Colley

(10) Patent No.: US 10,179,273 B2
(45) Date of Patent: Jan. 15, 2019

(54) GRASPABLE HUMAN PROPULSION DEVICE

(71) Applicant: John Christian Colley, Harrison City, PA (US)

(72) Inventor: John Christian Colley, Harrison City, PA (US)

( * ) Notice: Subject to any disclaimer, the term of this patent is extended or adjusted under 35 U.S.C. 154(b) by 144 days.

(21) Appl. No.: 15/436,882

(22) Filed: Feb. 20, 2017

(65) Prior Publication Data

US 2018/0236345 A1    Aug. 23, 2018

(51) Int. Cl.

| A63C 17/12 | (2006.01) |
|---|---|
| F01D 15/02 | (2006.01) |
| F01D 17/00 | (2006.01) |
| A63C 5/08 | (2006.01) |

(52) U.S. Cl.
CPC ............. *A63C 17/12* (2013.01); *A63C 5/08* (2013.01); *F01D 15/02* (2013.01); *F01D 17/00* (2013.01); *F05D 2220/00* (2013.01); *F05D 2240/90* (2013.01); *F05D 2270/02* (2013.01); *F05D 2270/3061* (2013.01)

(58) Field of Classification Search
CPC .............................. A63C 17/0013; A63C 17/12
See application file for complete search history.

(56) References Cited

U.S. PATENT DOCUMENTS

| 9,114,695 B2 | 8/2015 | Burgess |
|---|---|---|
| 9,387,388 B2 | 7/2016 | King |
| 2004/0231903 A1* | 11/2004 | Shayan ................ A63C 5/08 180/180 |
| 2006/0131084 A1* | 6/2006 | Rupp ................ A63C 17/0013 180/65.1 |
| 2007/0010143 A1* | 1/2007 | Burgess, Jr. ......... A63C 17/267 440/1 |
| 2008/0257628 A1* | 10/2008 | Pitt .................... A63C 17/0013 180/181 |
| 2008/0277180 A1 | 11/2008 | Pitt |
| 2008/0290616 A1* | 11/2008 | Burgess, Jr. ......... A63C 17/267 280/1 |
| 2011/0017539 A1* | 1/2011 | Pitt .................... A63C 17/0013 180/180 |
| 2012/0020790 A1* | 1/2012 | Burgess, Jr. ....... A63C 17/0013 416/63 |
| 2014/0109283 A1* | 4/2014 | Burgess, Jr. ............. B60K 8/00 2/69 |
| 2015/0064004 A1* | 3/2015 | Contoret .................. A63C 5/11 416/1 |
| 2017/0205820 A1* | 7/2017 | Liu ....................... G05D 1/0016 |
| 2017/0217511 A1* | 8/2017 | Orlovskiy .............. A63C 17/12 |

* cited by examiner

*Primary Examiner* — Bryan A Evans

(57) ABSTRACT

The invention is directed to a graspable human propulsion device which contains a ducted fan assembly on the aft portion of a longitudinal structure which the user grasps onto, which acts to propel the user along the longitudinal direction of the device while the user is mounted on a human transportation apparatus, such as a skateboard. The user can orient the device so that the ducted fan assembly leads ahead or trails behind the user, according to user preference. In one embodiment, the user controls the direction and amount of thrust by use of a spring twist throttle mechanism. In another embodiment, the user controls the direction and amount of thrust by use of a trigger and switch mechanism. The fore latch and the aft latch allow the user to clamp the device onto a skateboard deck for ease in transporting while on foot.

18 Claims, 12 Drawing Sheets

GRASPABLE HUMAN PROPULSION DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of Invention

This invention relates to propulsion accessories for imparting thrust pertaining to human transportation apparatuses, including skateboards, longboards, roller blades, skis, and snowboards.

Prior Art

Historically, propulsion of skateboards, longboards, roller blades, skis, snowboards, and similar personal transportation apparatuses relied solely on human power input or the force of gravity to achieve and maintain a velocity. In recent years, stored energy propulsion devices have developed, so as to propel humans mounted on these personal transportation apparatuses without the need of human power input or gravitational potential energy. Presently, a common solution for propelling skateboards is to use either a direct or indirect electric drive motor system connected to skateboard wheels. U.S. Pat. No. 9,387,388 B2 (King) is one example of such an installed drive system. However, it exemplifies the lack of versatility of direct and indirect drive motor systems, since they must be intricately installed onto the skateboard itself, and are not readily available to transfer to a different model skateboard or personal transportation apparatus should the user wish to do so. Therefore, significant cross-compatibility issues exist with these wheel drive motor systems.

U.S. 2008/0277180 A1 (Pitt) solves this cross-compatibility issue, however, the invention is not simple to use since it requires the user to maintain proper ground contact with the device at all times. This also creates serious safety issues since this device operates within close proximity to skateboard wheel assemblies, which can result in dangerous entanglements during operation. In addition, this invention is unable to operate on snowy or icy surfaces, should the user wish to use this invention with skis or a snowboard.

US 2015/0064004 A1 (Contoret) teaches a device that uses two air thrusters position at the ends of a pole, with the direction of thrust being transverse to the pole. This, however, can be uncomfortable to operate for users on skateboards or snowboards since the standard riding positions of such personal transportation apparatuses involves the user's chest pointing perpendicular to the direction of travel. So, in order for a user to operate this invention while on a skateboard or snowboard, the user has to continuously strain one's posture in order to align the thrust with the direction of motion. In addition, this is not a stable device to hold since the device can easily rotate up or down while in the user's hands, potentially producing an undesired downward or upward thrust component.

U.S. Pat. No. 9,114,695 B2 (Burgess) teaches of a back-worn device that utilizes a motorized propeller to propel the user while mounted on a human transportation apparatus. However, like US 2015/0064004 A1 (Contoret), the applications of this invention are limited since the direction of thrust is restricted to the direction in which the user's chest is facing, which is not practical for propelling a user on skateboard or snowboard, in which case the user's chest generally remains perpendicular to the direction of desired thrust when mounted. In addition, this apparatus is strapped to the user's back, which makes the device difficult for the user to ditch in the case of an emergency.

All the human propulsion devices heretofore known suffer from a number of disadvantages:

(a.) Motorized wheel drive assemblies lack versatility and are not cross-compatible with different skateboard models and other personal transportation apparatuses, presenting significant cross-compatibility issues.

(b.) Human propulsion devices consisting of motorized wheel drive assemblies suffer losses of performance on snowy or icy surfaces.

(c.) Motorized wheel drive assemblies as means for human propulsion currently consist of complex mechanisms, and also endure significant wear-and-tear.

(d.) If a human propulsion device is required to be strapped onto the body of the user, especially if it is required to be strapped onto the back, this can result in serious bodily injuries if the user accidently tumbles into objects or onto the ground.

(e.) User-held human propulsion devices of the present require skateboard riders to maintain uncomfortable postures in order to effectively generate thrust, thereby reducing the practicality and enjoyment of its usage.

(f.) Human propulsion devices in present use are bulky and can be very cumbersome to carry while the user is on foot.

Objects and Advantages

Accordingly, several objects and advantages of the present invention are:

(a.) to provide a human propulsion device which demonstrates versatility, such that the device is easily removable and compatible with an assortment of human transportation apparatuses, including skateboards, longboards, roller blades, skis, and snowboards;

(b.) to provide a human propulsion device which is comfortable to operate, particularly for users mounted on skateboards;

(c.) to provide a human propulsion device which is simple to construct and has few moving parts;

(d.) to provide a human propulsion device which is held by the user and is easy to ditch in the event of an emergency;

(e.) to provide a human propulsion device which operates regardless of the surface that the human transportation apparatus is on;

(f.) to provide a human propulsion device which is lightweight, compactable, and can be converted into a handle for carrying a skateboard while on foot.

Further objects and advantages will become apparent from a consideration of the ensuing description and drawings.

DRAWINGS—FIGURES

Figure 1:
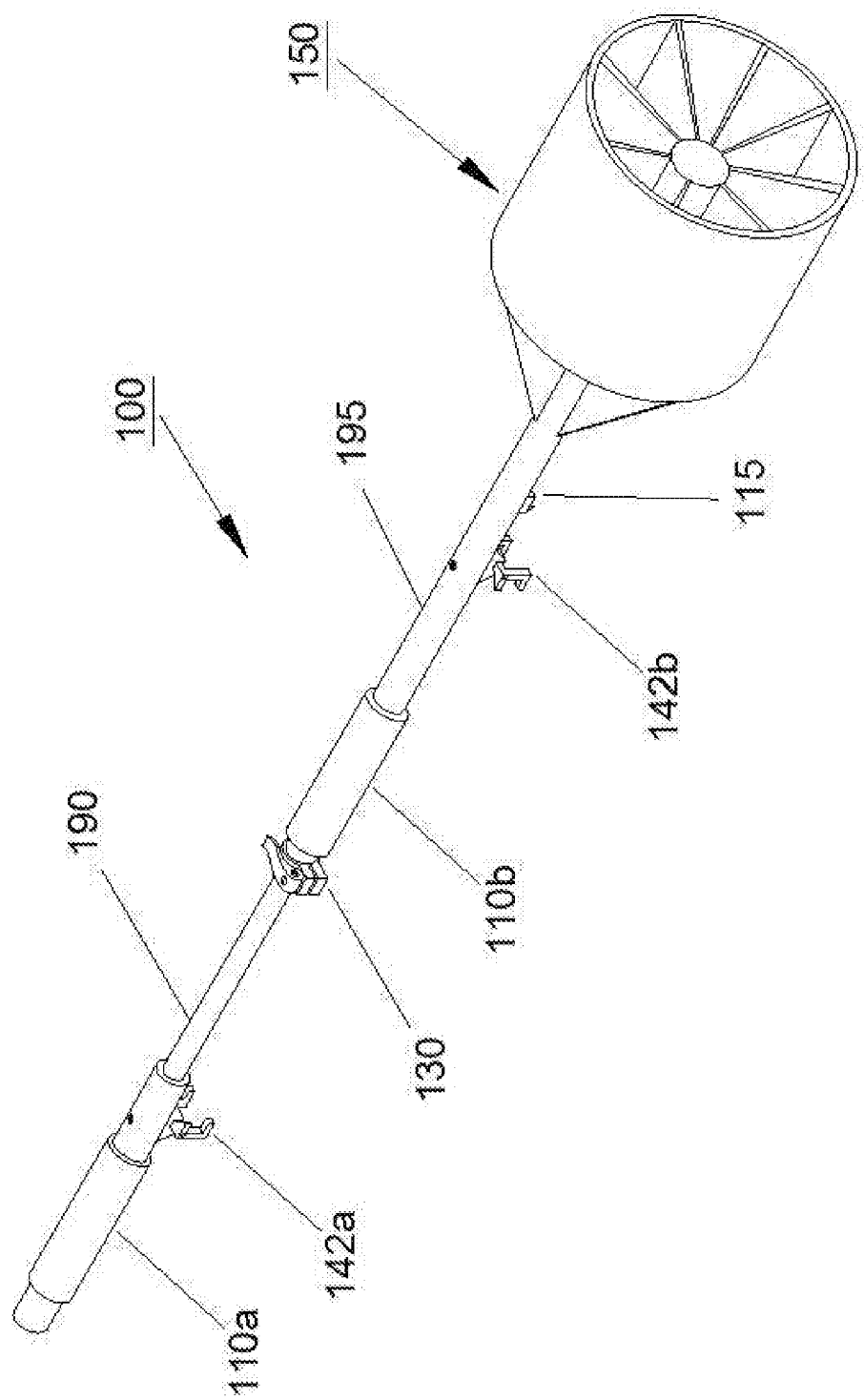
FIG. 1 is a top isometric view of a graspable human propulsion device in accordance with the present invention.

| REFERENCE NUMERALS | | | |
|---|---|---|---|
| 025- | User | 235- | Spring Pin Adjustment |
| 100- | Embodiment 1 | 260a- | Fore Thrust Direction Switch |
| 200- | Embodiment 2 | 260b- | Aft Thrust Direction Switch |
| 300- | Embodiment 3 | 270a- | Fore Protection Screen |
| 400- | Embodiment 4 | 270b- | Aft Protection Screen |
| 110a- | Fore Spring Twist Throttle | 272- | Fore Stators |
| 110b- | Aft Spring Twist Throttle | 274- | Aft Stators |
| 115- | Power Switch | 276- | Duct Wall |
| 130- | Lever Clamp | 280a- | Motor |
| 140- | Skateboard | 280b- | Electric Motor Symbol |
| 141- | Longboard | 284- | Propeller Fan |
| 142a- | Fore Latch | 286- | Fan Nose |
| 142b- | Aft Latch | 397- | Expanded Housing |
| 150- | Ducted Fan Assembly | 450- | Fore Ducted Fan Assembly |
| 190- | Fore Pole | 510- | Battery |
| 195- | Aft Pole | 520a- | Fore Potentiometer |
| 212- | Hand Grip | 520b- | Aft Potentiometer |
| 220a- | Fore Trigger Throttle | 530- | Electronic Speed Control |
| 220b- | Aft Trigger Throttle | 550- | Electric Potential Ground |

SUMMARY

In accordance with the present invention, a graspable human propulsion device comprises a graspable pole, an energy source, throttle controls, a motor, and a ducted fan assembly.

DETAILED DESCRIPTION—PREFERRED EMBODIMENT—FIGS. 1, 3, 4

A preferred embodiment 100 of the graspable human propulsion device of the present invention is illustrated in FIG. 1. The device has a hollow fore pole 190 of specific diameter consisting of a rigid material, preferably of light weight metal or composite. A hollow aft pole 195 of a larger inner diameter, preferably of the same material of hollow fore pole 190, such that fore pole 190 slides into hollow aft pole 195 when concentrically aligned, and locked to a specific insertion depth using lever clamp 130. Lever clamp 130 is rigidly attached to the tip of hollow aft pole 195 such that when clamp lever 130 is disengaged, fore pole 190 is free to slide into aft pole 195, and when lever clamp 130 is engaged, relative displacement of fore pole 190 and aft pole 195 becomes prohibited.

Figure 3:
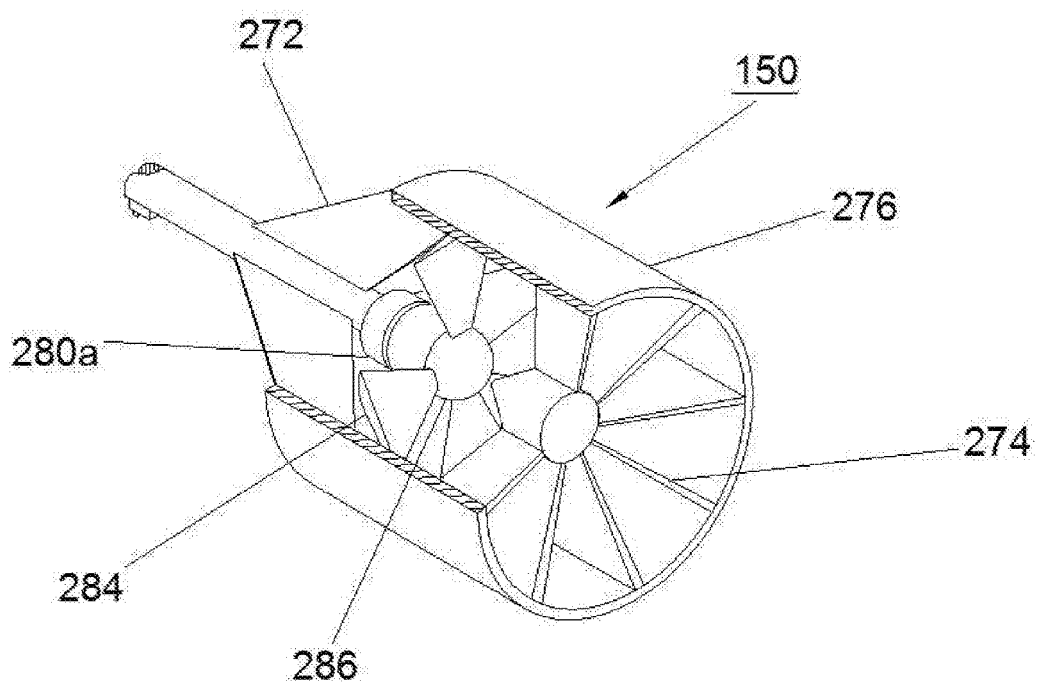
FIG. 3 is a cutaway isometric view of the ducted fan assembly in accordance with the present invention.

At the other end of aft pole 195, opposite the end which accepts slidable fore pole 190, is a fixed ducted fan assembly 150. FIG. 3 illustrates the inside of ducted fan assembly 150, which is enclosed by duct wall 276. Duct wall 276 is supported by fore stators 272 and aft stators 274. Enclosed within duct wall 276, between fore stators 272 and aft stators 274, is motor 280a, which is fixed to the end of aft pole 195. Propeller fan 284 is preferably concentrically attached directly to the shaft of motor 280a, without the use of a gearbox. Propeller fan cone 286 is then secured onto the shaft of motor 280a after propeller fan 284 has been slid onto the shaft of motor 280a. Preferably, the shaft of motor 280a has an external thread whereas fan nose 286 has a tapped hole, such that when the pair are tightened, they securely sandwich propeller fan 284 onto the shaft of motor 280a.

Figure 4:
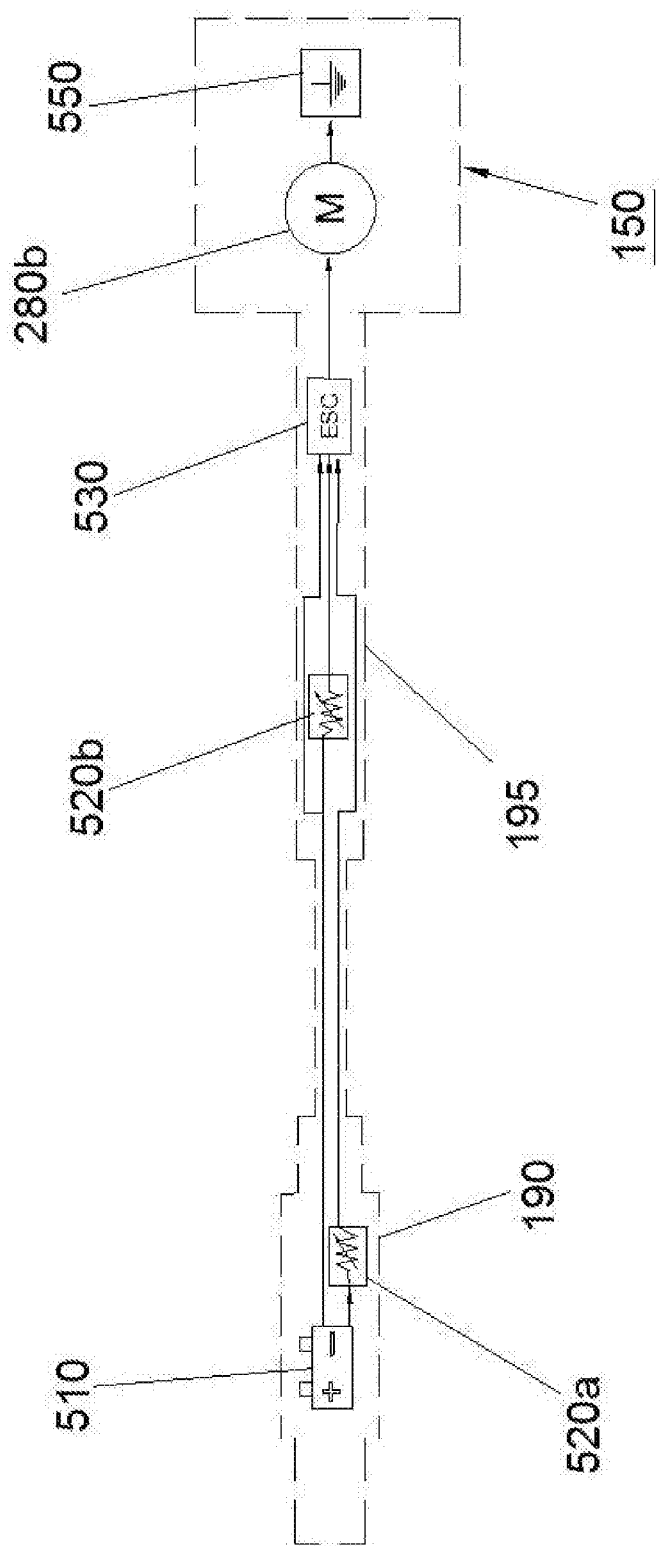
FIG. 4 is a block diagram of the components within the present invention.

Motor 280b is preferably powered by battery 510 through the use of an electronic speed control 530 as illustrated in FIG. 4. The preferred circuitry includes one wire from the positive terminal of battery 510 powering electronic speed control 530 directly. A second wire connects the positive terminal of battery 510 to fore potentiometer 520a, then to an input pin on electronic speed control 530, thereby providing a ranged analog input signal proportional to the resistance of fore potentiometer 520a. A third wire connects the positive terminal of battery 510 to aft potentiometer 520b, then to an input pin on electronic speed control 530, thereby providing a ranged analog input signal controlled by the resistance of aft potentiometer 520b.

Fore potentiometer 520a is fixed to the interior of fore pole 190, and is connected to and controlled by fore spring twist throttle 110a, which encircles a portion of fore pole 190, as illustrated in FIG. 1. Likewise, aft potentiometer 520b is fixed to the interior of aft pole 195, and is connected to and controlled by aft spring twist throttle 110b, which encircles a portion of aft pole 195.

Fore latch 142a is rigidly attached to the underside of fore pole 190 and aft latch 142b is rigidly attached to the underside of aft pole 195. The distance between these latches vary depending on the insertion depth of fore pole 190 into aft pole 195.

OPERATION—PREFERRED EMBODIMENT—FIGS. 8, 9, 10, 11, 12

Figure 9:
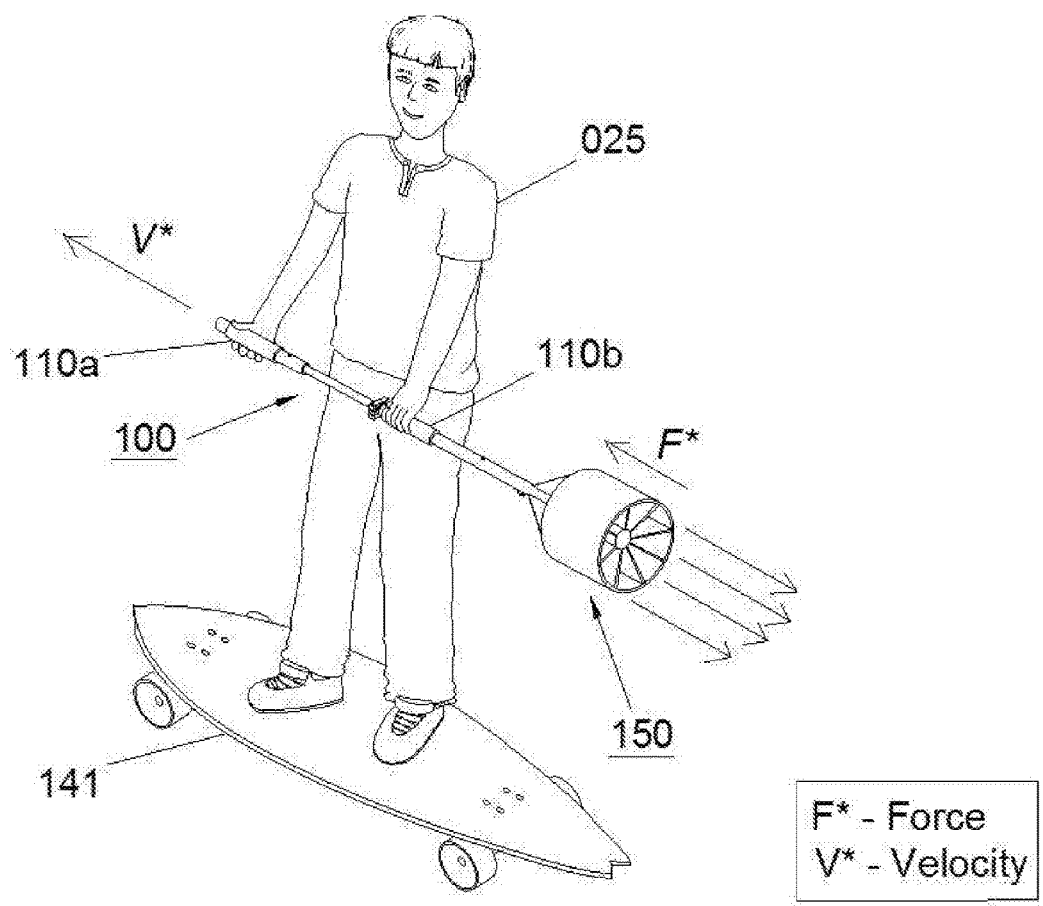
FIGS. 9-12 are top isometric views showing a user application of the present invention.
Figure 10:
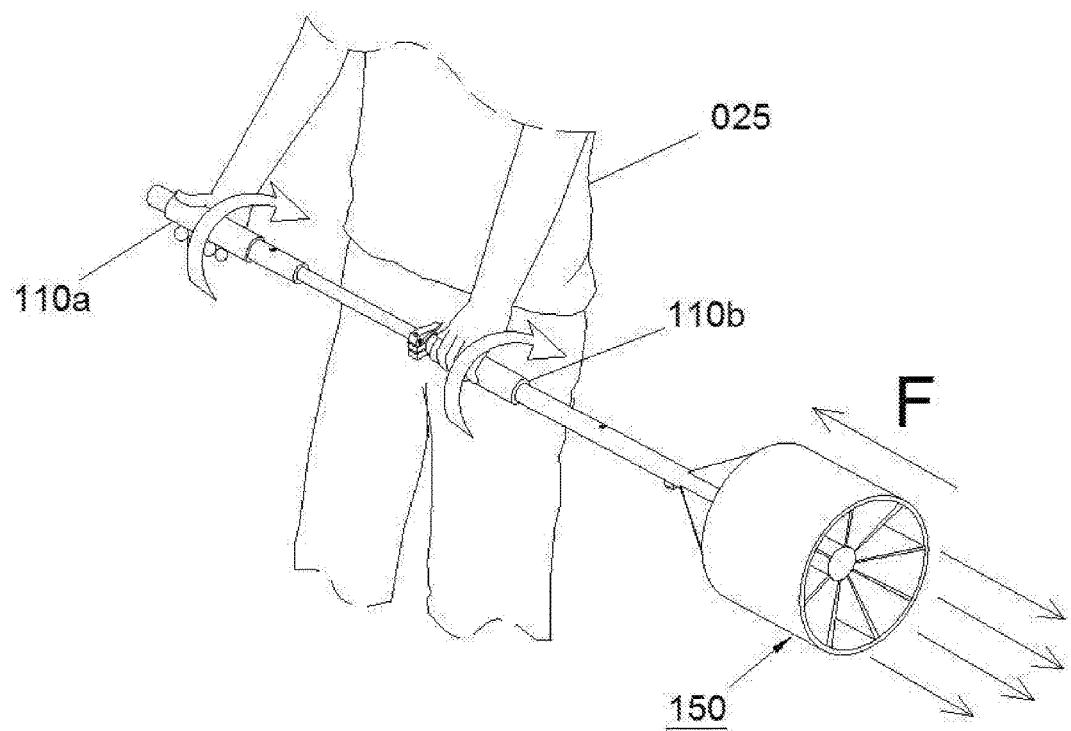
Figure 11:
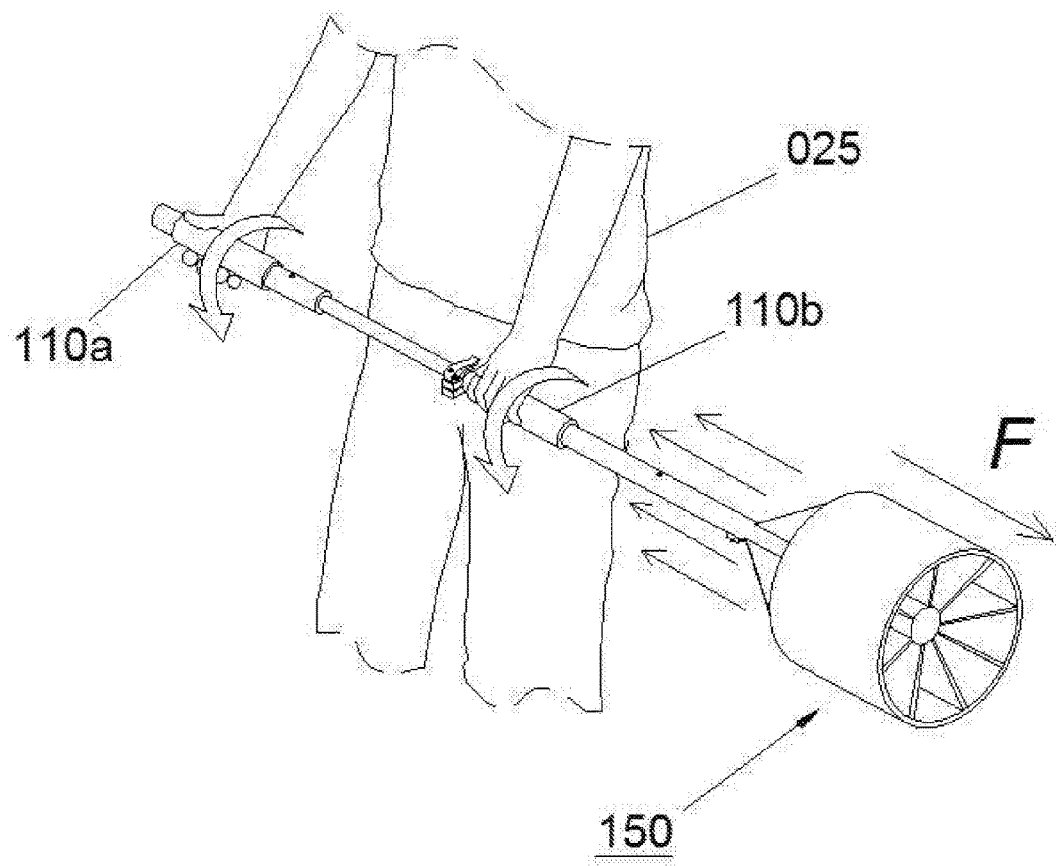

The manner of using the preferred embodiment of human graspable propulsion device 100 is illustrated in FIG. 9, FIG. 10, and FIG. 11. First, user 025 mounts onto a human transportation apparatus, in this case longboard 141. User 025 then stands on longboard 141 in the default riding position with the user's shoulders aligned parallel with the length of longboard 141. To operate the preferred embodiment of graspable human propulsion device 100, user 025 grasps graspable human propulsion device 100 with both hands, such that fore pole 190 is facing into the direction of forward travel. User 025 twists either fore spring twist throttle 110a or aft spring twist throttle 110b clockwise, as shown in FIG. 10. This action alters the resistance of either internal potentiometer 520a or 520b, signaling electronic speed control 530 to provide a proportional amount of power to motor 280a, which spins propeller fan 284. The rotation of propeller fan 284 thereby forces air through ducted fan assembly 150 and away from the center of graspable human propulsion device 100, thereby creating an equal and opposite force, which propels user 025 forward. This action enables user 025 to accelerate, or maintain a constant velocity, without requiring user 025 to provide manual propulsion means, such as pushing off the ground with a foot. Also, user 025 can combine this propulsion means with manual propulsion means to achieve even greater propulsive forces.

To cut off power from motor 280a, user 025 simply releases any clockwise displacements of fore spring twist throttle 110a or aft spring twist throttle 110b.

To slow down or travel in the reverse direction, user 025 twists either fore spring twist throttle 110a or aft spring twist throttle 110b counter-clockwise, as shown in FIG. 11. This action reverses airflow through ducted fan assembly 150, which provides a thrust in the reverse direction.

Figure 12:
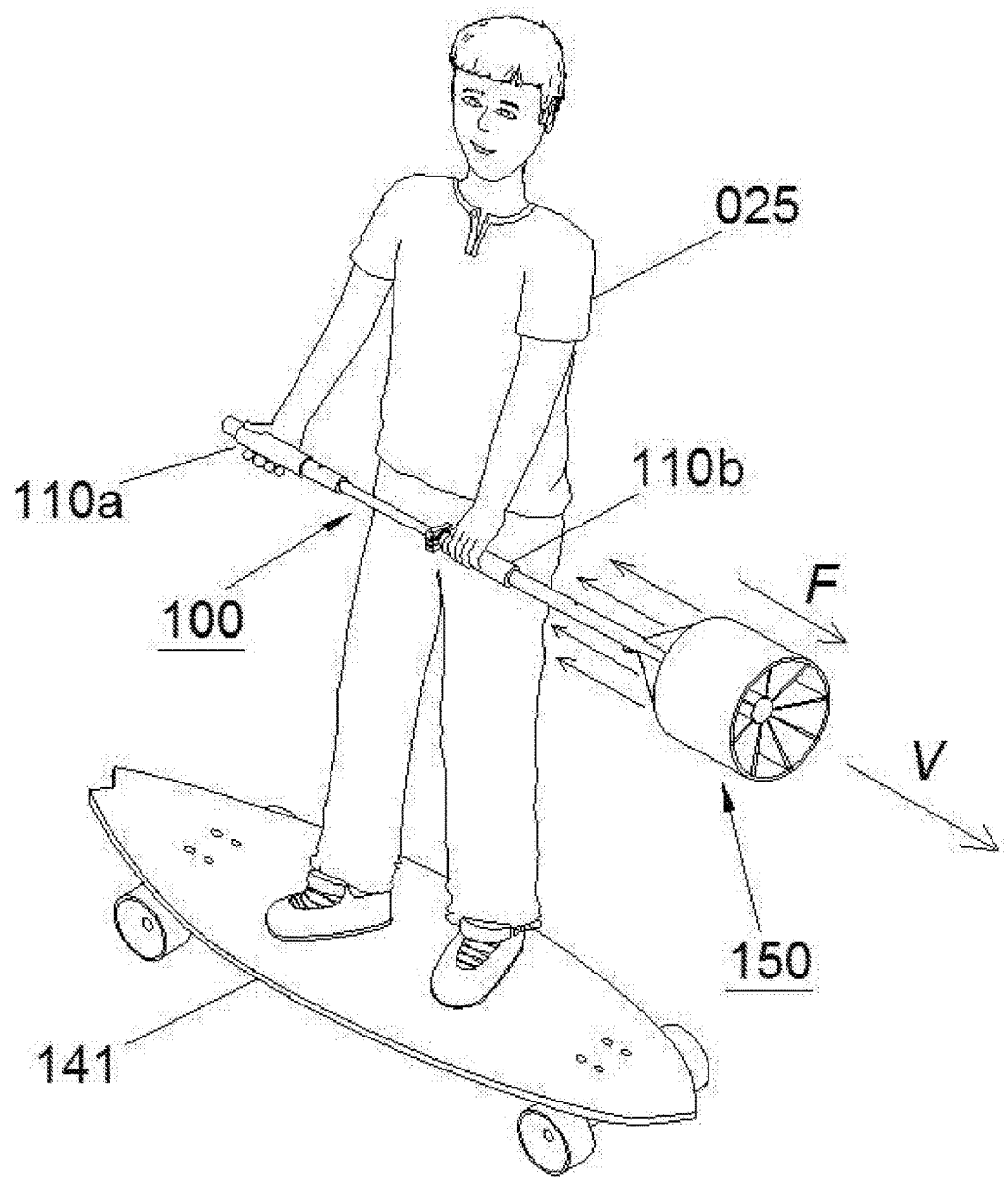

User 025 has the option to reverse the orientation of graspable human propulsion device 100 so that aft pole 195 now faces into the direction of forward travel as illustrated in FIG. 12. In this orientation, the controls of fore spring twist throttle 110a and aft spring twist throttle 110b are now reversed, should user 025 feel more comfortable holding graspable human propulsion device 100 in this orientation.

Figure 7:
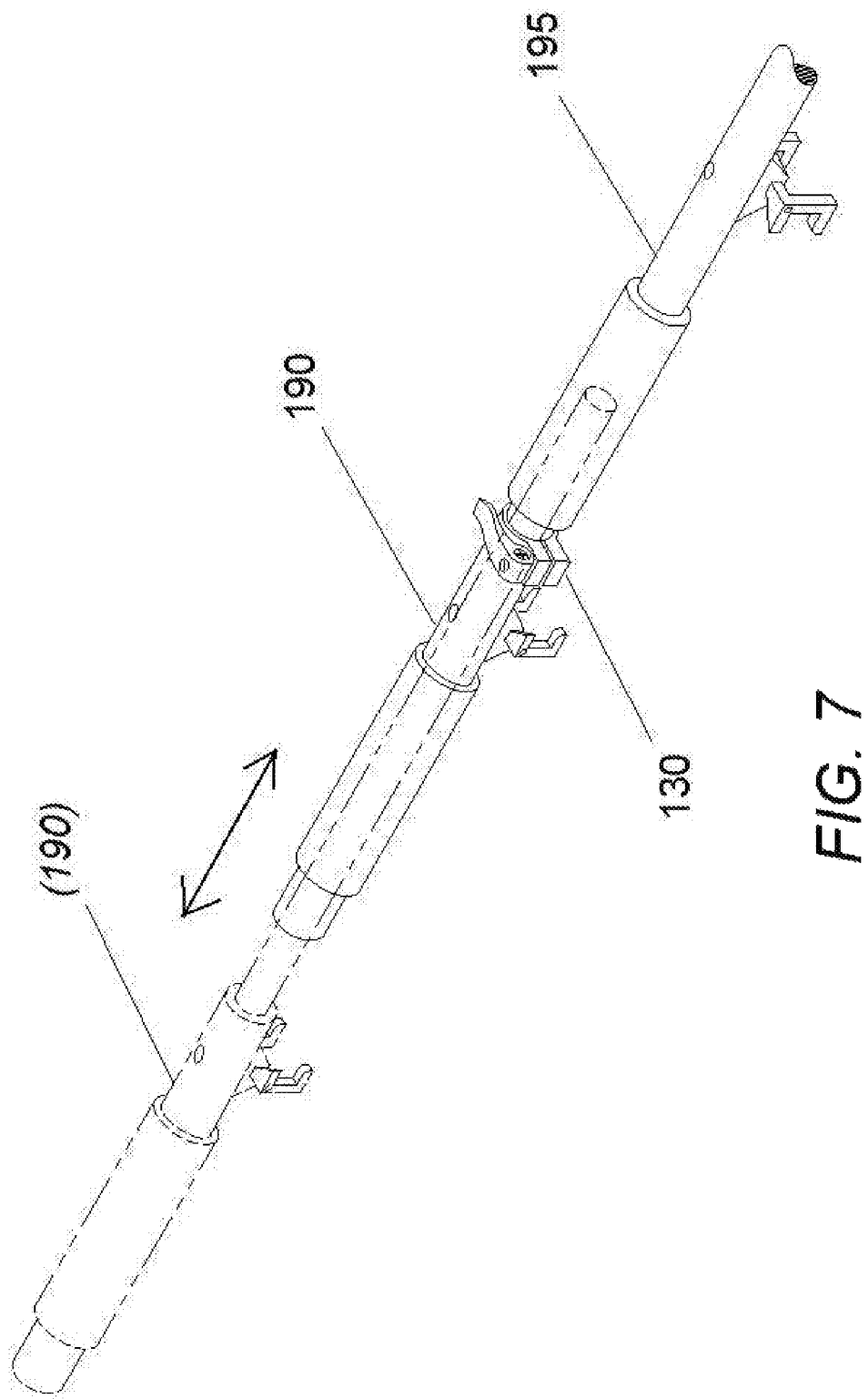
FIGS. 7-8 are top isometric views demonstrating the telescoping mechanism of the present invention, thereby allowing the invention to clamp itself to a skateboard.

To lengthen or contract the overall length of graspable human propulsion device 100, user 025 first releases lever clamp 130. This enables fore pole 190 to slide freely within aft pole 195 until the desired length is achieved, whereupon lever clamp 130 is reengaged, as shown in FIG. 7.

Figure 8:
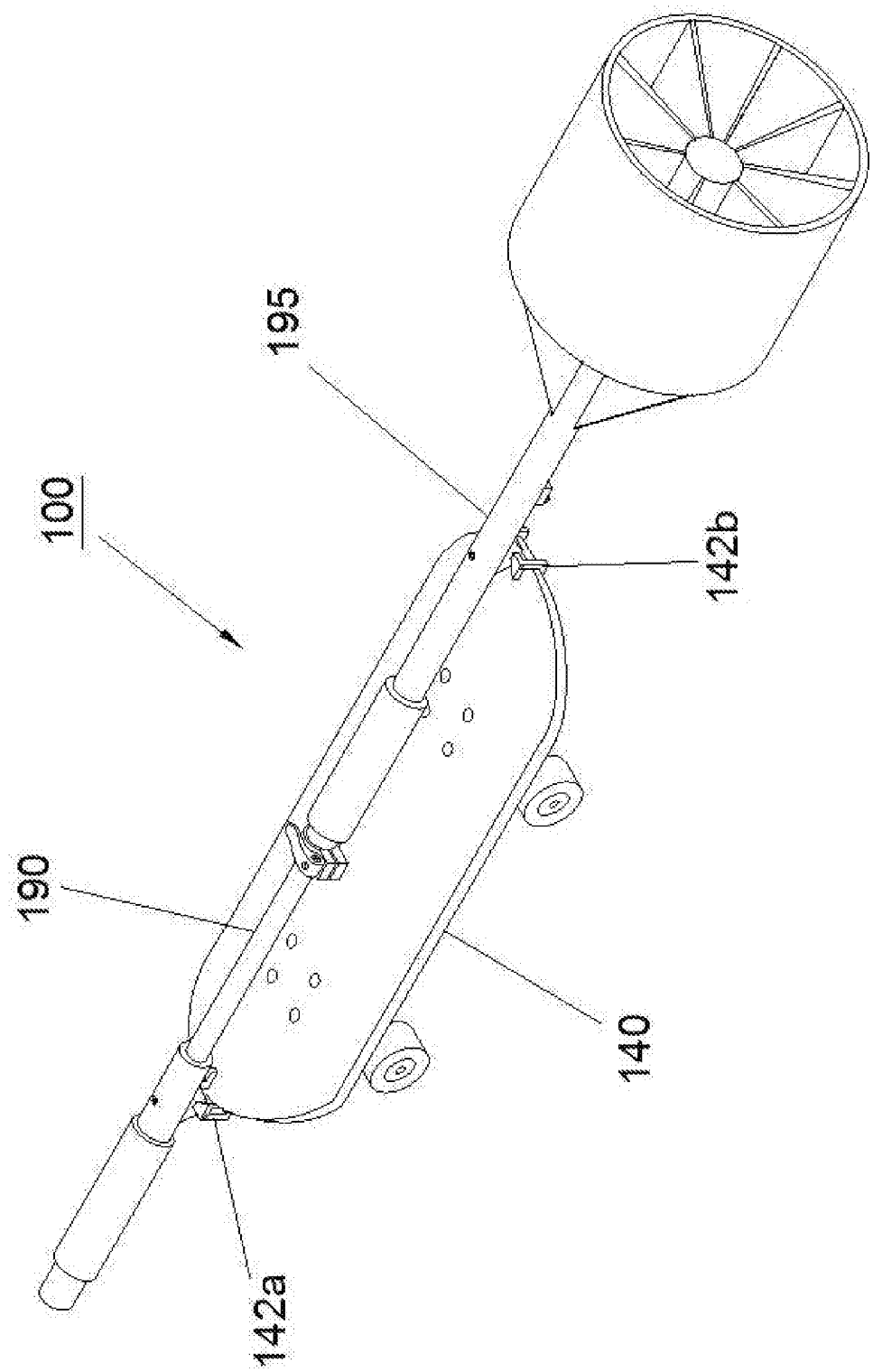

User 025 can rigidly attach graspable human propulsion device 100 to skateboard 140 so that user 025 can easily carry skateboard 140 by holding onto grasping human graspable propulsion device 100 only, as shown in FIG. 8. To do so, user 025 manually adjusts the length of graspable human propulsion device 100 so that fore latch 142a and aft latch 142b clamp onto the tips of skateboard 140.

DESCRIPTION—ADDITIONAL
EMBODIMENTS—FIGS. 2, 5, 6

Figure 2:
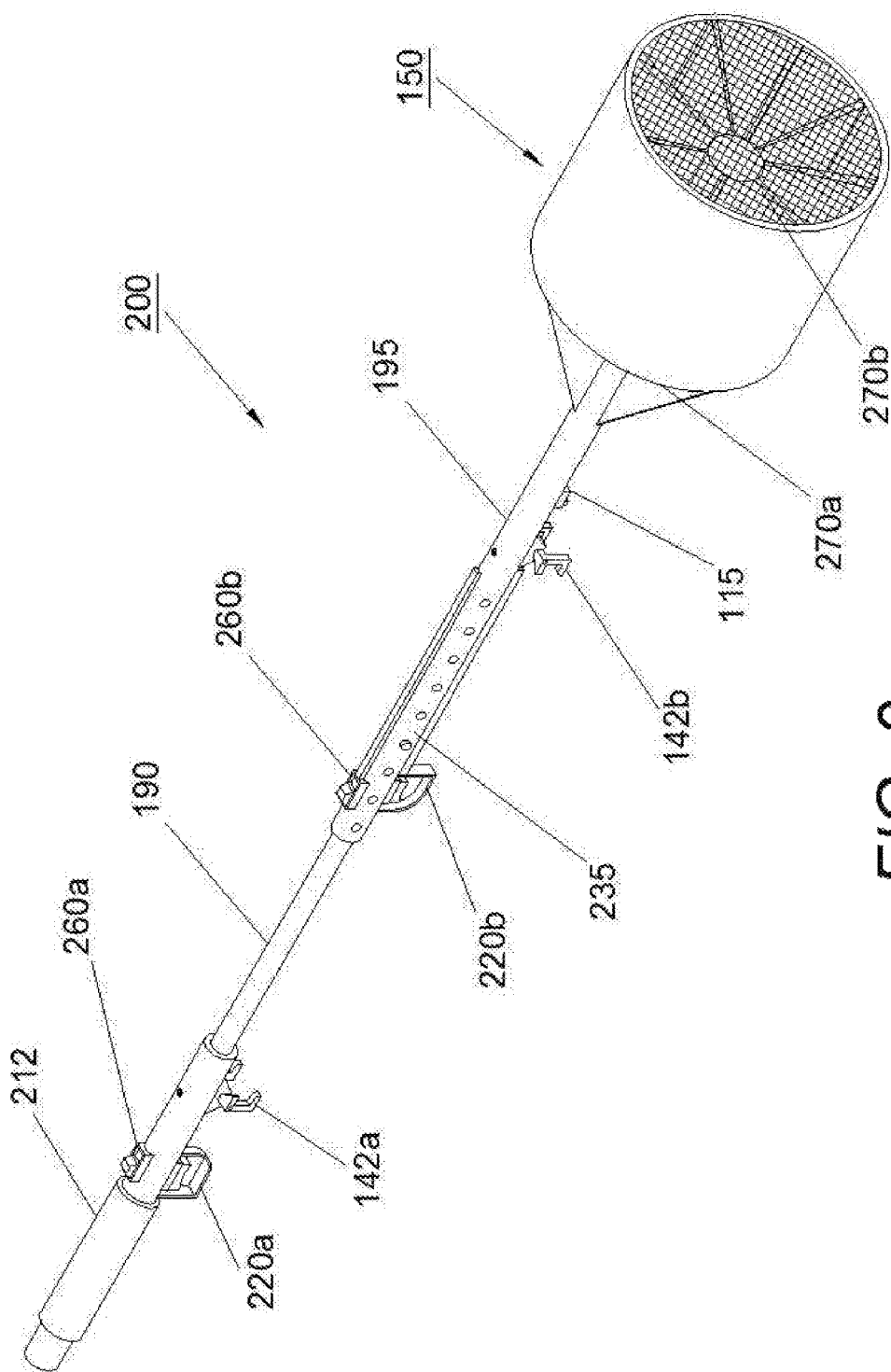
FIG. 2 is a top isometric view of another embodiment of a graspable human propulsion device in accordance with the present invention.

An additional embodiment 200 is shown in FIG. 2. Fore trigger throttle 220a and aft trigger throttle 220b replaces fore spring twist throttle 110a and aft spring twist throttle 110b. Fore trigger throttle 220a protrudes out of a cut away in fore pole 190, and is attached to fore potentiometer 520a so that when fore trigger throttle 220a is pulled, the resistance of fore potentiometer 520a alters. Aft trigger throttle 220b protrudes out of a cut away in the aft pole 195, and is attached to aft potentiometer 520b so that when aft trigger throttle 220b is pulled, the resistance of aft potentiometer 520b alters.

Fore thrust direction switch 260a is located on fore pole 190, above fore trigger throttle 220a. Fore thrust direction switch 260a is connected in series with and between battery 510 and an input pin on electronic speed control 530. Aft thrust direction switch 260b is located on aft pole 195 above aft trigger throttle 220b. Aft thrust direction switch 260b is connected in series with and between battery 510 and an input pin on electronic speed control 530.

Spring pin adjustment 235 replaces lever clamp 130 as a means to prevent fore pole 190 from sliding in and out of aft pole 190 as shown in FIG. 2.

Fore protection screen 270a is adhered to the opening of ducted fan assembly 150 on the side closest to the center of graspable human propulsion device 200. Aft protection screen 270b is adhered to the opening of ducted fan assembly 150 on the side farthest from the center of human graspable propulsion device 200.

Figure 5:
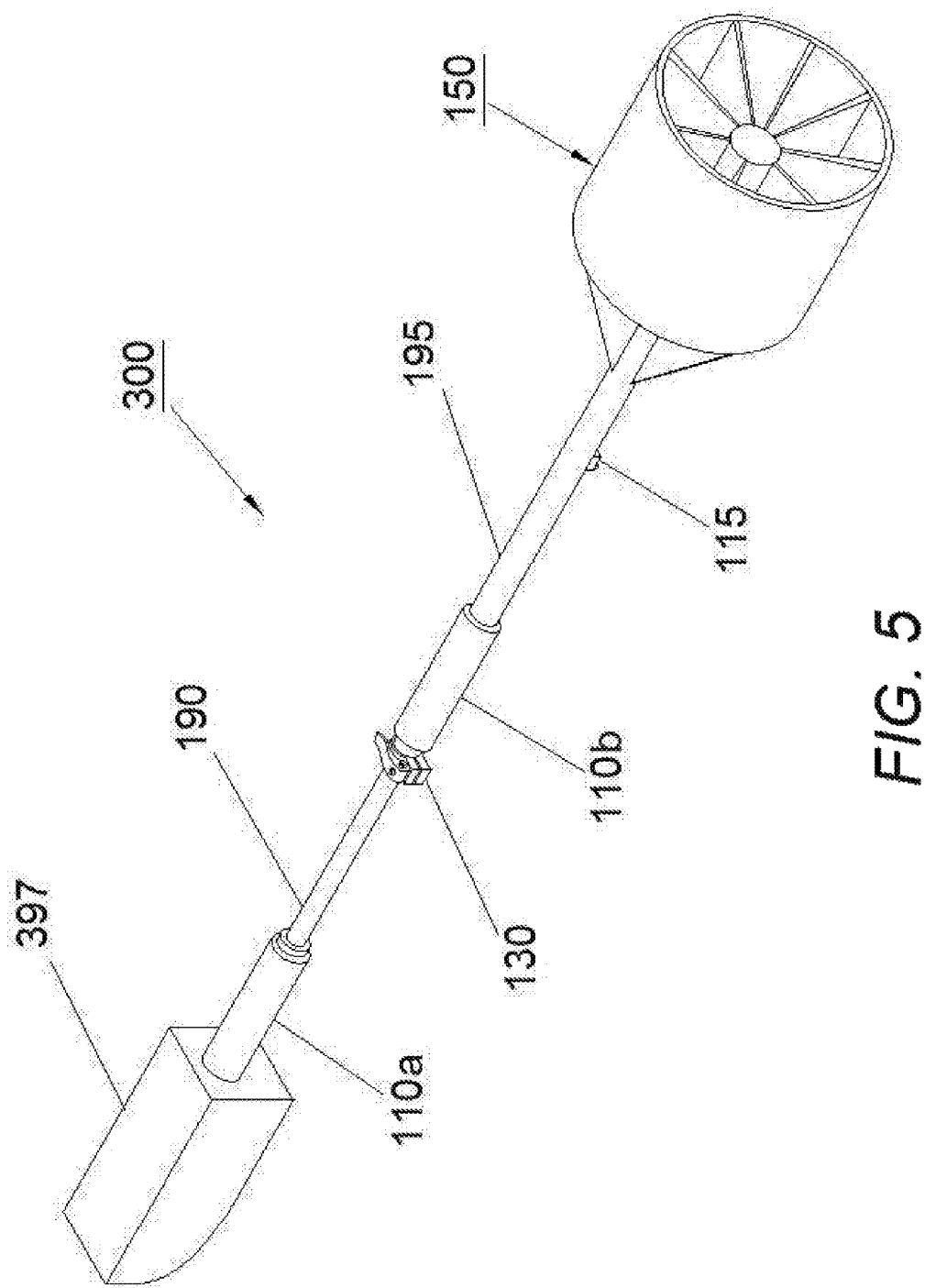
FIGS. 5-6 are top isometric views of additional embodiments of a graspable human propulsion device in accordance with the present invention.

FIG. 5 shows an additional embodiment 300 containing an expanded hollow housing 397 attached to fore pole 190.

Figure 6:
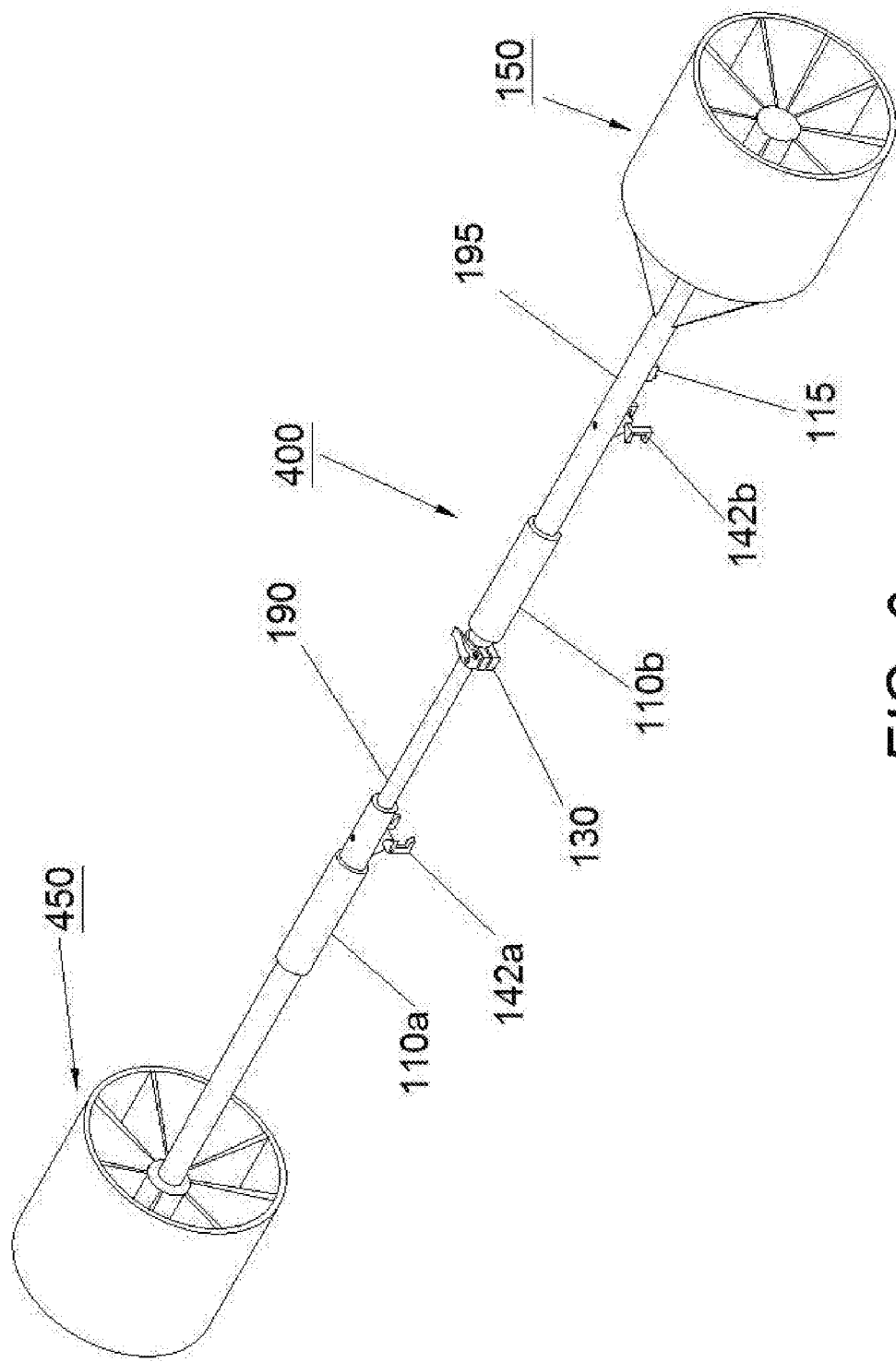

FIG. 6 shows an additional embodiment 400 that has fore ducted fan assembly 450 secured to fore pole 190, such that fore ducted fan assembly 450 responds to the same control input as ducted fan assembly 150.

OPERATION—ADDITIONAL
EMBODIMENTS—FIG. 2

FIG. 2 illustrates the operation of human graspable propulsion device 200. User 025 powers motor 280a by pulling either fore trigger throttle 220a or aft trigger throttle 220b. Fore trigger throttle 220a controls the resistance of fore potentiometer 520a, shown in FIG. 4. The voltage drop across fore potentiometer 520a is read by electronic speed control 530, which regulates motor 280b power according to the amount fore trigger throttle 220a is pulled. Aft trigger throttle 220b controls the resistance of aft potentiometer 520b. The voltage drop across aft potentiometer 520b is read by electronic speed control 530, which regulates motor 280b power according to the amount aft trigger throttle 220b is pulled.

Fore thrust direction switch 260a is a two position switch that controls what direction graspable human propulsion device 200 is propelled in when fore trigger throttle 220a is pulled. Aft thrust direction switch 260b is a two position switch that controls which direction graspable human propulsion device 200 is propelled in when aft trigger throttle 220b is pulled.

User 025 can use hand grip 212 on fore pole 190 as a secure and comfortable area to hold onto.

CONCLUSION, RAMIFICATIONS, AND SCOPE

Accordingly, the reader will see that the graspable human propulsion device of this invention can be utilized to propel oneself while mounted on a human transportation apparatus. The user has different options as to how one chooses to hold and operate the graspable human propulsion device, according to preference. Furthermore, the graspable human propulsion device has the additional advantages in that (a.) the user will have a convenient and enjoyable method of propelling oneself while mounted on a human transportation apparatus such as a skateboard, longboard, roller blades, skis, or a snowboard.
(b.) this device is cross-compatible with a variety of makes and models of human transportation apparatuses.
(c.) this device does not require any tedious installation on existing human transportation apparatuses.
(d.) this device is easy to wield and control compared to prior art.
(e.) this device alleviates the concern for wear and tear associated with wheel drive assemblies used by prior art.
(f.) this device is grasped by the user's hands, allowing for easy ditching in the case of an emergency.
(g.) this device is effective at producing thrust on paved, dirt, gravel, snowy, and icy surfaces.
(h.) this device is lightweight, compactable, and can be converted into a handle for carrying a skateboard while on foot.

While the above description contains many specifities, these should not be construed as limitations on the scope of the invention, but as exemplifications of the presently preferred embodiments thereof. Many other ramifications and variations are possible within the teachings of the invention. For example, the graspable human propulsion device may utilize a small internal combustion engine instead of an electric motor; the fore and aft spring twist throttles may be reduced to just a single spring twist throttle; the fore and aft poles may be reduced into a single rigid pole; the longitudinal pole may contain additional surfaces and housings along its length.

Thus the scope of the invention should be determined by the appended claims and their legal equivalents, and not by the examples given.

I claim:

1. A graspable human propulsion device comprising:

(a.) a pole of sufficient size to accommodate holding by a human being;
(b.) a motor positioned proximate one end of said pole;
(c.) a stored energy means operatively engaged with said motor and configured to supply power thereto;
(d.) a propeller fan positioned proximate said motor and a means for said motor delivering rotational power to said propeller fan;
(e.) a housing for enclosing said propeller fan comprising an inlet and an outlet wherein said outlet having a cross section relatively perpendicular to the longitudinal axis of said pole thereby causing accelerated flow to be discharged relatively parallel to the longitudinal axis of said pole;
(f.) one or more control means for allowing a human being to regulate the rotational speed and direction of said motor;
whereby said graspable human propulsion device generates human regulated thrust along the longitudinal axis of said pole by accelerating air in the opposite direction of desired thrust.

2. The graspable human propulsion device according to claim 1 wherein said pole is a telescoping pole consisting of a first pole and a second pole so that said first pole inserts into a hollow portion of said second pole, and a means for affixing said first pole at a desired insertion depth into said second pole.

3. The graspable human propulsion device according to claim 2 wherein said means for affixing said first pole at a desired insertion depth into said second pole consists of a lever clamp rigidly attached on the insertion entrance of said second pole whereby creating enough static friction between said lever clamp and said first pole whenever said lever clamp is engaged.

4. The graspable human propulsion device according to claim 2 wherein said means for affixing said first pole at a desired insertion depth into said second pole consists of a spring pin protruding out of the side of said first pole, positioned near the end that inserts into said second pole, and a row of spaced holes in the wall of said second pole, wherein the diameter of said holes are slightly larger than the diameter of said spring pin, thereby causing said first pole to lock into place at certain insertion depths when said spring pin snaps into said holes of said second pole.

5. The graspable human propulsion device according to claim 1 wherein said control means consists of one or more spring loaded twist grips encircling said pole, configured to be twisted by a human being whereby the angular displacements of said spring loaded twist grips control the rotational direction and rotational power delivered to said propeller fan.

6. The graspable human propulsion device according to claim 1 wherein said control means consists of one or more spring loaded triggers attached to said pole configured to be pulled by a human finger whereby the displacement of said spring loaded triggers controls the rotational power delivered to said propeller fan.

7. The graspable human propulsion device according to claim 6 wherein each said spring loaded trigger has a corresponding switch located proximate corresponding said spring loaded trigger, and configured so that the state of said switch determines the rotation direction of said propeller fan when said corresponding spring loaded trigger is pulled.

8. The graspable human propulsion device according to claim 1 wherein said housing for enclosing said propeller fan has a protective screen on said inlet and a protective screen on said outlet.

9. The graspable human propulsion device according to claim 1, further including an expanded housing of the size to accommodate additional batteries.

10. The graspable human propulsion device according to claim 2, further including a first latch positioned to the underside of said first pole and a second latch positioned on the underside of said second pole, said first latch and said second latch being of adequate shape such that when said telescoping pole contracts, said first latch makes contact with the front edge of a skateboard deck and said second latch makes contact with the back edge of said skateboard deck, whereby said graspable human propulsion device is secured to said skateboard deck.

11. The graspable human propulsion device according to claim 1, further including a second motor, a second propeller fan, and a second housing positioned proximate the opposite end of said pole where said motor, said propeller fan, and said housing aforementioned in claim 1 are positioned.

12. The graspable human propulsion device according to claim 1, wherein said propeller fan is a variable pitch propeller fan.

13. A personal propulsion device, comprising:
(a.) a longitudinal structure of rigid material with an approximate length between 1 foot and 6 feet;
(b.) a motor positioned proximate one end of said longitudinal member;
(c.) a stored energy means operatively engaged with said motor and configured to supply power thereto;
(c.) a ducted fan positioned proximate said motor and a means for said motor delivering rotational power to said ducted fan;
(d.) a housing for enclosing said ducted fan comprising an inlet and an outlet oriented so that the direction of accelerated airflow is parallel to the longitudinal axis of said longitudinal member;
(e.) one or more control means for allowing a human being to regulate the rotational speed and direction of said motor;
whereby said personal propulsion device generates human regulated thrust along the longitudinal axis of said longitudinal structure by accelerating air in the opposite direction of desired thrust so as to propel a human being while mounted on a personal transportation apparatus.

14. The personal propulsion device according to claim 13 wherein said longitudinal structure is a telescoping pole consisting of a first pole and a second pole, wherein said first pole inserts into a hollow portion of said second pole, and a means for affixing said first pole at a desired insertion depth into said second pole.

15. The personal propulsion device according to claim 14, further including a first latch positioned to the underside of said first pole and a second latch positioned on the underside of said second pole, said first latch and said second latch being of adequate shape such that when said telescoping pole contracts, said first latch makes contact with the front edge of a skateboard deck and said second latch makes contact with the back edge of said skateboard deck.

16. The personal propulsion device according to claim 13 wherein said control means consists of one or more spring loaded twist grips encircling said longitudinal structure, configured to be twisted by a human being whereby the angular displacement of said spring loaded twist grips controls the rotational direction and rotational power delivered to said ducted fan.

17. The personal propulsion device according to claim 13 wherein said control means consists of one or more spring loaded triggers attached to said pole configured to be pulled by a human finger whereby the displacement of said spring loaded triggers controls the rotational power delivered to said ducted fan.

18. A method of propelling a human being while mounted on a personal transportation apparatus, comprising:
- (a.) a graspable human propulsion device as claimed in claim 1,
- (b.) providing a human transportation means selected from a skateboard, longboard, roller blades, skis, snowboard, or the like,
- (c.) the user mounting said personal transportation means,
- (d.) the user grasping said graspable human propulsion device,
- (e.) pointing said graspable human propulsion device in the direction of desired acceleration,
- (f.) activating said control means so that the motor rotates the propeller fan, whereby said graspable human propulsion device generates human regulated thrust along the longitudinal axis thereof by accelerating air in the opposite direction of desired thrust.

* * * * *